May 23, 1967
A. L. NEUHOFF ET AL
3,320,656
METHOD OF MAKING A STRUCTURAL MEMBER
Original Filed Dec. 18, 1963
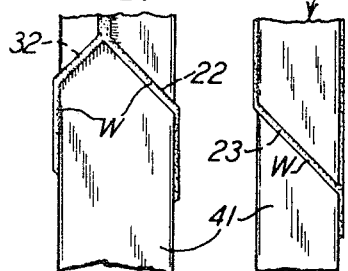
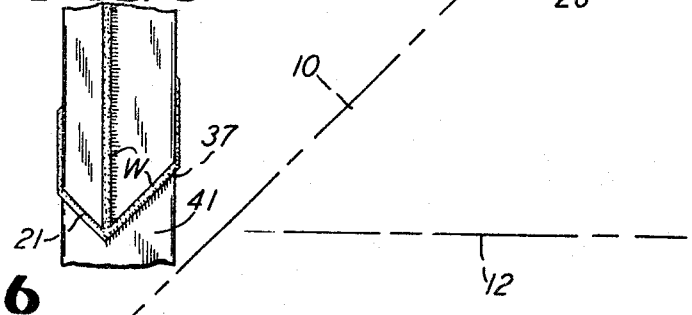
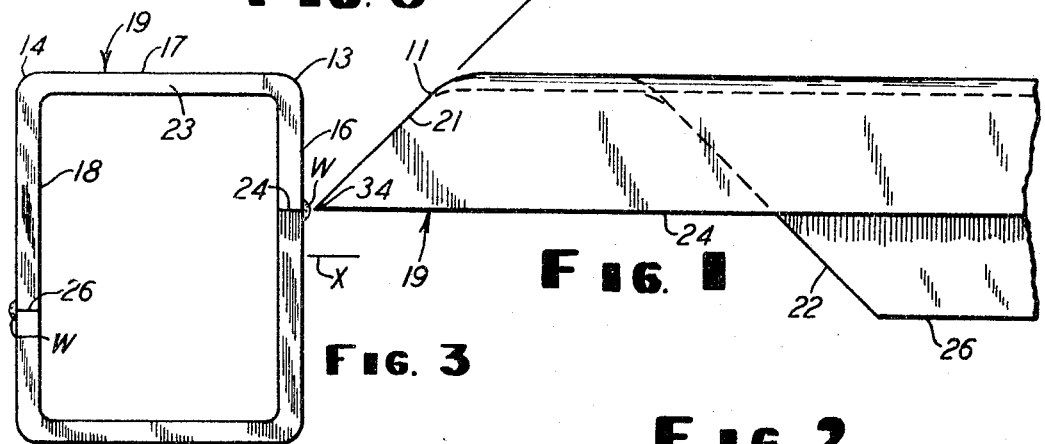
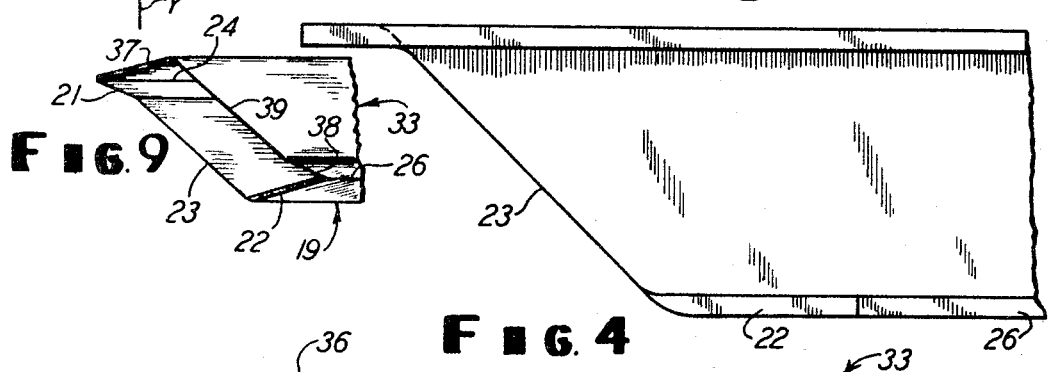
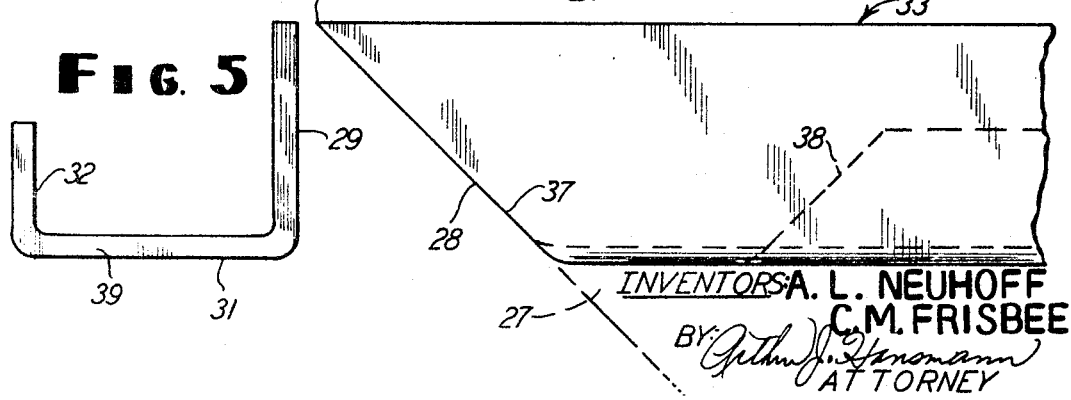
INVENTORS
A. L. NEUHOFF
C. M. FRISBEE
BY
ATTORNEY 3,320,656
METHOD OF MAKING A STRUCTURAL MEMBER
Alfred L. Neuhoff, Dubuque, and Claude M. Frisbee, Burlington, Iowa, assignors to J. I. Case Company, Racine, Wis., a corporation of Wisconsin
Original application Dec. 18, 1963, Ser. No. 331,586, now Patent No. 3,293,822, dated Dec. 27, 1966. Divided and this application Oct. 12, 1966, Ser. No. 586,104
6 Claims. (Cl. 29—155)

This is a division of U.S. patent application Ser. No. 331,586, filed Dec. 18, 1963, and now U.S. Patent No. 3,293,822 granted Dec. 27, 1966. This invention relates to a method of making a structural member.

Structural members of the type which are the subject of this invention are provided in many environments, and in this instance this member has particular application in the structural member which is provided for resisting both torsional and deflectional forces. Also, the structural member is described as an elongated hollow member for resisting forces and having particular application in the agricultural implement field, where for instance the member may serve as a brace for a bulldozer blade, a boom for a back hoe or earth digger, and many other applications where a generally light weight but strong structural member is required. One such application of this member is found in U.S. Patent No. 2,943,407 where thrust arms are employed for supporting a bulldozer blade on a tractor.

It is an object of this invention to provide a method of making a structural member which is of a minimum weight and material but of a maximum strength in resisting forces applied thereto. In accomplishing this particular object, the structural member is described as being of a hollow elongated configuration and formed by bending two sheets of metal into mating shapes and welding the shapes together at points which are remote from the points of maximum strain normally applied to the member.

Still another object of this invention is to provide a method of making a structural member with the heretofore mentioned features, and with the member being inexpensive in manufacture, light weight in relation to its strength, and easily manufactured and capable of being provided with the use of existing manufacturing equipment.

Still another object of this invention is to provide a method of making a structural member of a relatively light weight and inexpensive construction but which provides a maximum resistance to torsional, tension, and compression forces.

Still a further and more specific object of this invention is to provide a method of making a structural member of a fabricated type which is made from cutting and bending two pieces of sheet metal into mated form wherein the metal can be easily removed from the bending dies and wherein the desired end cut of the metal can be easily made prior to assembly and welding of the two pieces.

Still a further object of this invention is to provide a method of making a structural member of the fabricated type which has a hollow or box-type cross-section and which can be welded to a solid piece such as a casting or forging with a maximum of strength in resisting forces applied to the solid piece. This particular object is accomplished by having the weldment between the pieces exist along lines which are not subjected to maximum strain and thus the weldment is capable of withstanding a greater strain since it is both out of the line of maximum strain and is also of an increased length so that the unit stress along the weldment will be lower than otherwise.

Other objects and advantages become apparent upon reading the following description in light of the accompanying drawings, wherein:

FIG. 1 is a top plan view of one piece of the structural member, and with the dot-dash lines showing the piece prior to its final form.

FIG. 2 is a side elevational view of FIG. 1.

FIG. 3 is an end elevational view of FIG. 1 with a part added thereto as shown in FIGS. 4 and 5.

FIG. 4 is a top plan view of another piece of the structural member, and with the dot-dash line showing a part of the piece prior to its final form.

FIG. 5 is an end elevational view of FIG. 4.

FIG. 6 is a top plan view of the structural member of FIG. 3 with a cast or forged piece added thereto.

FIG. 7 is a left side view of FIG. 6.

FIG. 8 is a right side view of FIG. 6.

FIG. 9 is a side view of a part of the structural member and showing it from a slight underneath angle.

FIG. 1 shows a planar sheet 10 indicated by dot-dash lines and also by the solid lines to be a sheet of metal with the leading edge 11 at an oblique angle to the longitudinal or central axis designated 12, and the angle is shown to be 45 degrees. The term "oblique" means at a slant, or not perpendicular nor transverse. In the manufacture of the piece, the sheet is bent into a U-shape as shown in FIG. 3, and the bending of course takes place along the lines or corners 13 and 14 of the piece to present one side or leg 16 and intermediate portion 17 and another side or leg 18. Thus there is formed a piece generally designated 19 with two legs 16 and 18 of unequal lengths. Of course the piece would be readily formed over a forming die by well-known processes, and because of the different lengths of the legs 16 and 18 the piece can be easily removed from the forming die. Also because of the oblique edge 11, the piece has the angularity along the edge 11 in its formed configuration as shown.

Therefore, the piece 19 is provided with an angled front edge 21 and an angled edge 22 which is itself at a right-angle to the edge 21, and there is the intermediate and angularly disposed edge 23. Further the piece has the longitudinal edge 24 at the terminal end of the side 16, and it has the longitudinal edge 26 at the terminal end of the side 18. Of course the sheet 10 also has the particular thickness shown for structural strength of the particular application to which the sheet is to be employed.

Another sheet indicated in part at 27 in FIG. 4 is likewise provided with an oblique angle shown to be at 45 degrees along the edge 28 of the sheet 27. The sheet 27 is then formed or bent into the U-shape shown in FIG. 5 to have the longer leg 29, the intermediate portion 31, and the shorter leg 32 with the legs 29 and 32 being of course the sides of the piece generally designated 33.

It will also be noted that the pieces 19 and 33 are mating pieces and somewhat reversely formed such that the long and short legs or sides of each piece are paired together to form opposite sides in the assembled piece shown in FIG. 3 so that these opposite sides are of equal length as shown. Of course it will further be understood and noted that the foremost points 34 and 36 of the sheets 19 and 33 respectively are brought together in the assembled position in FIG. 3. Still further the mated edges of the two pieces 19 and 33 are welded by weldments indicated W along the longitudinal lines or seams of the assembled pieces. The important point is then that the weldments W are not on the central longitudinal plane indicated X in FIG. 3, and of course there is no weldment on the longitudinal plane indicated Y in FIG. 3. Thus recognizing and understanding the maximum strain in a structural piece exists on the longitudinal planes X and Y, and such strain may be induced by torsional forces, it will now be appreciated that the location of the welds W offset from the longitudinal planes removes the welds from the point of maximum strain on the structure.

Of course also in the formation of the sheet 27 with the oblique edge 28 and the bending shown, it will be appreciated that there is provided an oblique edge 37 on the side 29 and an oblique edge 38 on the side 32 and an oblique edge 39 on the intermediate portion 31. In the assembled view shown in FIGS. 6–9, it will now be noted that the edges 23 and 39 are offset from each other with respect to the length of the assembled structural member, and of course the other four edges of the two pieces are disposed at angles with their adjacent piece. This arrangement therefore provides for maximum strength along the weldments between the assembled two pieces and a cast or forged or otherwise formed piece indicated 41 in FIGS. 6, 7, and 8.

FIGS. 6, 7, and 8 show the complete structural member with the pieces 19 and 33 welded on their oblique edges to the additional or third piece 41 which is of course the cast or forged piece mentioned. It will be therefore appreciated that the piece 41 may include a bearing or other element which is preferably retained in the solid member as described. These drawings also show that the fabricated piece and the cast or forged piece are joined together on the oblique edges of the fabricated pieces 10 and 27 by the weldments indicated W. Thus FIGS. 7 and 8 indicate that the weldment W along the oblique edges, such as the edges 21 and 37 in FIG. 8, is at an angle on opposite sides of the longitudinal plane of the assembled structure. Therefore, under for instance torsional forces on the structure at the two ends thereof, the weldment on one side of the angle would be placed in compression while the weldment on the other side would be placed in tension, and therefore the weld itself is somewhat neutralizing with respect to the forces applied by torsion as well as compressive and tensile forces which are applied to the assembled structure. Further it will be appreciated that the weldment between the fabricated and solid pieces does not extend transverse to the longitudinal axis of the pieces and it is therefore longer than a transverse weld and is accordingly stronger both because of its location and inherent resistance to strain as well as because of the distribution of forces along the greater area of the weld and therefore the lower unit stress results.

It will therefore be noted and understood that the member 41 has its end or edge which lies along the weldments W in FIGS. 6, 7, and 8 shaped to conform to the edges of pieces 19 and 33 as shown for instance in FIG. 9. This therefore makes the member 41 an extension of the fabricated member, and the member 41 may also have a mating and telescopic relation with the fabricated members 19 and 33 in order that there be acceptable and well-known contact or abutment between the two sections described so that the welding can be accomplished in the most secure manner.

Also, it will now be understood that the width of the cross-section is less than the height thereof as shown in FIG. 3. This, therefore, provides a structure which resists torsional forces. Still further, it will be understood that a single forming die can be used and depending upon the length of for instance, the longer side of the cross-section, the rectangular shape of the cross-section can be easily altered as desired, and provided in the proportions desired.

While a specific method of making this structural member has been shown and described, it should be obvious that certain changes could be made therein and the invention should therefore be determined only by the scope of the appended claims.

What is claimed is:

1. A method of making a structural member of two pieces of metal mated and welded together, comprising the steps of forming a first planar metal piece with a diagonally disposed edge extending along a plane oblique to a central axis extending along one face of said first piece, bending said first piece along two lines parallel to and on opposite sides of said axis into two side portions of unequal lengths extending in the direction of the other face of said first piece with respect to the unbent plane of said first piece, forming a second planar metal piece with a diagonally disposed edge extending along a plane oblique to a central axis extending along one face of said second piece, bending said second piece along two lines parallel to and on opposite sides of said axis into two side portions of unequal lengths extending in the direction of the other face of said second piece with respect to the unbent plane of said second piece and with the latter said side portions being respectively aligned with corresponding ones of said side portions of said first piece and disposed to mate therewith, mating and welding said two pieces together along the corresponding mating ones of said side portions with the foremost point of each of said edges being aligned together, and mating and welding an additional piece to said two pieces along said edges.

2. The method of claim 1, including the step of forming said diagonally disposed edges at angles geometrically complementary to each other.

3. The method of claim 2, including the step of forming said first piece and said second piece from the same original piece, and cutting each of said angles at forty-five degrees and in a single cut at forty-five degrees across said original piece.

4. The method of claim 1, including the step of forming the corresponding mating ones of said side portions into a pair with each said pair being of a total length equal to the total length of the other one of said pairs.

5. The method of claim 1, with the combined additional steps of both claims 2 and 4.

6. The method of claim 1, with the combined additional steps of both claims 3 and 4.

References Cited by the Examiner
UNITED STATES PATENTS

| | | | |
|---|---|---|---|
| 2,085,829 | 7/1937 | Rogers | 29—155 |
| 2,125,692 | 8/1938 | Ragsdale et al. | 52—731 X |
| 2,678,488 | 5/1954 | Erzer | 29—155 |

JOHN F. CAMPBELL, *Primary Examiner.*

THOMAS H. EAGER, *Examiner.*